(12) United States Patent
Yanagida et al.

(10) Patent No.: US 8,460,825 B2
(45) Date of Patent: Jun. 11, 2013

(54) LITHIUM ION SECONDARY BATTERY

(75) Inventors: Katsunori Yanagida, Kobe (JP); Koh Masahara, Osaka (JP); Masahisa Fujimoto, Osaka (JP)

(73) Assignee: SANYO Electric Co., Ltd., Moriguchi, Osaka (JP)

( * ) Notice: Subject to any disclaimer, the term of this patent is extended or adjusted under 35 U.S.C. 154(b) by 418 days.

(21) Appl. No.: 12/869,364

(22) Filed: Aug. 26, 2010

(65) Prior Publication Data

US 2011/0052990 A1   Mar. 3, 2011

(30) Foreign Application Priority Data

Aug. 28, 2009  (JP) ................. 2009-198233
Feb. 24, 2010  (JP) ................. 2010-038332

(51) Int. Cl.
*H01M 4/505* (2010.01)
*H01M 4/52* (2010.01)

(52) U.S. Cl.
USPC .................. 429/224; 429/223; 429/231.3

(58) Field of Classification Search
None
See application file for complete search history.

(56) References Cited

U.S. PATENT DOCUMENTS

| 6,623,890 | B2 * | 9/2003 | Munakata et al. | ....... 429/231.95 |
| 7,955,734 | B2 * | 6/2011 | Shimizu et al. | ............... 429/223 |
| 2007/0141470 | A1 * | 6/2007 | Nakura | ....................... 429/231.3 |
| 2008/0044736 | A1 * | 2/2008 | Nakura | .......................... 429/339 |
| 2008/0145760 | A1 | 6/2008 | Yoon et al. | |
| 2008/0206644 | A1 | 8/2008 | Kanno et al. | |

FOREIGN PATENT DOCUMENTS

| JP | 2003-068298 A | 3/2003 |
| JP | 2004-161526 A | 6/2004 |
| JP | 2008-147068 A | 6/2008 |
| JP | 2008-153214 A | 7/2008 |
| JP | 2008-207997 A | 9/2008 |
| JP | 2008-270086 A | 11/2008 |
| JP | 2009-110942 A | 5/2009 |
| JP | 2009-110943 A | 5/2009 |
| JP | 2009-110949 A | 5/2009 |
| WO | WO-2005/081338 | * 9/2005 |

OTHER PUBLICATIONS

Armstrong, Robert A. et al. "Demonstrating Oxygen Loss and Associated Structural Reorganization in the Lithium Battery Cathode Li[Ni0.2Li0.2Mn0.6]O2," JACS Articles, Jun. 2006, pp. 8864-8698, vol. 128, No. 26.

* cited by examiner

*Primary Examiner* — John S Maples
(74) *Attorney, Agent, or Firm* — Westerman, Hattori, Daniels & Adrian, LLP (57) ABSTRACT

A lithium ion secondary battery including a positive electrode containing a positive electrode active material, a negative electrode containing a negative electrode active material, and a nonaqueous electrolyte. The positive electrode active material is a lithium transition metal oxide that contains niobium and is represented by $xLi[Li_{1/3}Mn_{2/3-q}Nb_q]O_2 \cdot (1-x)LiM_{1-r}Nb_rO_2$ ($0<x<1$, $0<xq+(1-x)r\leq0.3$, $0\leq q\leq0.3$, $0\leq r\leq0.3$, and M: at least one element selected from the group consisting of nickel, cobalt, and manganese). During initial charging, oxygen desorbs from the positive electrode active material.

14 Claims, 6 Drawing Sheets

LITHIUM ION SECONDARY BATTERY

BACKGROUND OF THE INVENTION

1. Field of the Invention

The present invention relates to a lithium ion secondary battery that uses, as a positive electrode active material, a lithium transition metal oxide (also referred to as "lithium-excess transition metal oxide" hereinafter) in which lithium occupies the transition metal site.

2. Description of the Related Art

Due to the increasing performance and functionality of portable appliances, it has been required that secondary batteries used as power sources of such portable appliances have higher capacities. Lithium ion secondary batteries are one type of secondary battery that is expected to meet this requirement. A typical lithium ion secondary battery uses lithium cobaltate as the positive electrode active material and graphite as the negative electrode active material.

Lithium ion secondary batteries of ever higher capacities are expected to be achieved to further pursue advancement in performance and functionality of portable appliances.

Lithium-excess transition metal oxides that contain lithium occupying the transition metal site are drawing attention as a positive electrode active material that can increase the capacity density per weight.

A lithium-excess transition metal oxide represented by $Li(Li_aMn_xNi_yCo_z)O_2$ ($0<a\leq0.34$, $0.35\leq x<1$, $0<y\leq0.30$, $0<z\leq0.30$, and $0.95\leq a+x+y+z\leq1.05$) is a solid solution of $Li[Li_{1/3}Mn_{2/3}]O_2$ and $Li[NiCoMn]O_2$. As described in R. Armstrong et al., J. Am. Chem. Soc., 128, 8694-8698 (2006) (Non-patent Document 1), $Li[Li_{1/3}Mn_{2/3}]O_2$ alone can negligibly contribute to charging and discharging but when $Li[Li_{1/3}Mn_{2/3}]O_2$ forms a solid solution with $Li[NiCoMn]O_2$, for example, a relatively large irreversible capacity can be obtained and oxygen desorbs from the active material during initial charging.

Japanese Published Unexamined Patent Application No. 2008-207997 (Patent Document 1) describes that the capacity density of $Li[Li_{1/3}Mn_{2/3}]O_2$ alone can be increased by doping $Li[Li_{1/3}Mn_{2/3}]O_2$ with niobium (Nb).

Japanese Published Unexamined Patent Application No. 2003-68298 (Patent Document 2) describes that the cycle durability is improved by using a lithium transition metal oxide for a lithium secondary battery positive electrode active material represented by $Li_aNi_xCo_yMn_zM_pO_2$ (where $1.00\leq a\leq1.20$, $0.20\leq x<0.50$, $0.20<y\leq0.45$, $0.20\leq z\leq0.50$, $0.0005\leq p\leq0.05$, $x+y+z+p=1$, and M represents a metal element selected from group 4 (4a) elements and group 5 (5b) elements in the periodic table).

Japanese Published Unexamined Patent Application Nos. 2004-161526, 2008-147068, 2008-270086, 2009-110942, 2009-110943, and 2009-110949 (Patent Documents 3 to 8) describe a lithium transition metal oxide represented by $Li_xNi_{(1-y-z-a)}Co_yMn_zM_aO_2$ (M represents at least one element selected from the group consisting of Fe, V, Cr, Ti, Mg, Al, Ca, Nb, and Zr, and x, y, and z respectively satisfy $1.0\leq x\leq1.10$, $0.4\leq y+z\leq0.7$, and $0.2\leq z\leq0.5$, $0\leq a\leq0.02$), and that incorporation of the metal element M stabilizes the crystal structure.

Japanese Published Unexamined Patent Application No. 2008-153214 (Patent Document 9) describes that when a lithium-excess transition metal oxide represented by $yLi[Li_{1/3}Me_{2/3}]O_2\cdot(1-y)LiMe'O_2$ is doped with molybdenum (Mo), titanium (Ti), or the like, the material can have various oxidation numbers and the energy density per volume of an electrode can be increased.

However, none of the above cited documents disclose a method for improving the cycle characteristics, at a high charging voltage, of a lithium ion secondary battery that uses a lithium-excess transition metal oxide as a positive electrode active material from which oxygen desorbs during initial charging.

SUMMARY OF THE INVENTION

It is desirable to provide a lithium ion secondary battery that uses, as the positive electrode active material, a lithium-excess transition metal oxide from which oxygen desorbs during the initial charging and that has good cycle characteristics at a high charging voltage.

An aspect of the present invention provides a lithium ion secondary battery that includes a positive electrode containing a positive electrode active material, a negative electrode containing a negative electrode active material, and a non-aqueous electrolyte, in which the positive electrode active material is a lithium transition metal oxide that contains niobium and is represented by $xLi[Li_{1/3}Mn_{2/3-q}Nb_q]O_2\cdot(1-x)LiM_{1-r}Nb_rO_2$ ($0<x<1$, $0<xq+(1-x)r\leq0.3$, $0\leq q\leq0.3$, $0\leq r\leq0.3$, and M: at least one element selected from the group consisting of nickel, cobalt, and manganese).

Although M in the formula representing the lithium transition metal oxide represents at least one element selected from the group consisting of nickel, cobalt, and manganese, M may contain impurities other than nickel, cobalt, and manganese. In particular, a transition metal such as iron and zirconium and an alkaline earth metal such as magnesium and calcium may be contained in M in an amount of 0.1 mol % or less relative to the total amount of M.

M in the formula representing the lithium transition metal oxide preferably represents three elements, nickel, cobalt, and manganese.

More preferably, the lithium transition metal oxide containing niobium is represented by $xLi[Li_{1/3}Mn_{2/3-q}Nb_q]O_2\cdot(1-x)Li(Ni_yCo_{1-y-z}Mn_z)_{1-r}Nb_rO_2$ ($0<x<1$, $0<xq+(1-x)r\leq0.3$, $0\leq q\leq0.3$, $0\leq r\leq0.3$, $0.2\leq y\leq0.4$, and $0.2\leq z\leq0.4$). This is because a higher discharge capacity can be achieved.

Since the positive electrode active material has the $xLi[Li_{1/3}Mn_{2/3-q}Nb_q]O_2$ structure, oxygen desorbs from the positive electrode active material during initial charging.

Another aspect of the present invention provides a lithium ion secondary battery including a positive electrode containing a positive electrode active material, a negative electrode containing a negative electrode active material, and a non-aqueous electrolyte, in which positive electrode active material is a lithium transition metal oxide that contains niobium and is represented by $Li(Li_aMn_bNi_cCo_dNb_p)O_2$ ($0<a\leq0.34$, $0.35\leq b<1$, $0<c\leq0.30$, $0<d\leq0.30$, $0<p\leq0.30$, and $0.95\leq a+b+c+d+p\leq1.05$). The manganese (Mn) content b, the nickel (Ni) content c, and the cobalt (Co) content d in the lithium transition metal oxide preferably respectively satisfy $0.4\leq b<0.67$, $0.05\leq c<0.2$, and $0.05\leq d<0.3$. This is because the capacity of the lithium ion secondary battery can be increased further. Yet more preferably, a in the formula satisfies $0<a<0.33$.

According to these aspects of the present invention, the cycle characteristics can be improved when the charge and discharge is conducted at a high charging voltage, e.g., a positive electrode potential of 4.5 V or more on a lithium basis.

In the formulae representing the lithium transition metal oxides described above, p preferably satisfies $0.0025\leq p\leq0.02$ and $xq+(1-x)r$ preferably satisfies $0.0025\leq xq+(1-x)r\leq0.02$.

The lithium transition metal oxides preferably include a structure that belongs to space group C2/c or C2/m.

DESCRIPTION OF THE PREFERRED EMBODIMENTS

A positive electrode, a negative electrode, and a nonaqueous electrolyte that make up a lithium ion secondary battery according to an embodiment of the present invention will now be described in detail.

Positive Electrode

A positive electrode of this embodiment contains, as the positive electrode active material, a lithium transition metal oxide that contains niobium and is represented by $Li(Li_aMn_bNi_cCo_dNb_p)O_2$ ($0<a\leq0.34$, $0.35\leq b<1$, $0<c\leq0.30$, $0<d\leq0.30$, $0<p\leq0.30$, and $0.95\leq a+b+c+d+p\leq1.05$). Since the positive electrode active material is a lithium-excess transition metal oxide with lithium occupying the transition metal site and contains niobium, the cycle characteristics in high-charge-voltage cycles can be improved.

The niobium content is preferably 0.05 mol % or more and 10 mol % or less (in other words, $0.0005\leq p\leq0.1$), more preferably 0.1 mol % or more and 2 mol % or less (in other words, $0.001\leq p\leq0.02$), yet more preferably 0.25 mol % or more and 2 mol % or less (in other words, $0.0025\leq p\leq0.02$), and most preferably 0.25 mol % or more and 1 mol % or less (in other words, $0.0025\leq p\leq0.01$).

During initial charging, oxygen desorbs from the positive electrode active material. The positive electrode active material is preferably a lithium transition metal oxide that desorbs oxygen during initial charging when the potential of a positive electrode in a fully charged state is 4.5 V or more on a metallic lithium basis.

The lithium transition metal oxide preferably includes a structure that belongs to space group C2/c or C2/m. Inclusion of such a structure stabilizes the crystal structure, and the lithium ion secondary battery can thus display high capacity and good cycle characteristics.

The lithium transition metal oxide can be manufactured through a method commonly employed in synthesizing transition metal oxides, such as a solid phase method. For example, a lithium transition metal oxide can be synthesized by adding a niobium-containing compound such as niobium oxide to a raw material of the lithium transition metal oxide and firing the resulting mixture at a temperature of 700° C. to 950° C.

The positive electrode active material is kneaded with a conductant agent such as acetylene black or carbon black and a binder such as polytetrafluoroethylene (PTFE) or polyvinylidene fluoride (PVdF) to prepare a positive electrode mix, which is used to make the positive electrode.

In order to use such a positive electrode in a lithium ion secondary battery, the potential of the positive electrode in a fully charged state is preferably 4.5 V or more on a metallic lithium basis. When this potential is 4.7 V or more, a higher capacity is achieved. Although the upper limit of the potential is not particularly defined, the upper limit is preferably 5.0 V or less since an excessively high potential causes decomposition of electrolyte, for example.

Negative Electrode

A material that can occlude and desorb lithium is preferably used as the negative electrode active material. Examples thereof include lithium metal, lithium alloys, carbonaceous materials, and metal compounds. These negative electrode active materials can be used alone or in combination.

Examples of the lithium alloys include a lithium aluminum alloy, a lithium silicon alloy, a lithium tin alloy, and a lithium magnesium alloy.

Examples of the carbonaceous materials that occlude and desorb lithium include natural graphite, synthetic graphite, coke, vapor-phase grown carbon fibers, mesophase pitch carbon fibers, spherical carbon, and resin-fired carbon.

Nonaqueous Electrolyte

Nonaqueous electrolytes commonly used in lithium ion secondary batteries can be used as the nonaqueous electrolyte. Cyclic carbonates, chain carbonates, esters, cyclic ethers, chain ethers, nitriles, and amides can be used as the solvent of the nonaqueous electrolyte.

Examples of the cyclic carbonates include ethylene carbonate, propylene carbonate, and butylene carbonate. Some or all of hydrogen atoms of these carbonates may be fluorinated. Examples thereof include trifluoropropylene carbonate and fluoroethylene carbonate.

Examples of the chain carbonates include dimethyl carbonate, ethyl methyl carbonate, diethyl carbonate, methyl propyl carbonate, ethyl propyl carbonate, and methyl isopropyl carbonate. Some or all of hydrogen atoms may be fluorinated.

Examples of the esters include methyl acetate, ethyl acetate, propyl acetate, methyl propionate, ethyl propionate, and γ-butyrolactone.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ethers.

Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxy benzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile. Examples of the amides include dimethyl formamide.

At least one solvent selected from the aforementioned solvents can be used in this embodiment.

Lithium salts commonly used as electrolytes of lithium ion secondary batteries may be used as the electrolyte to be added to the nonaqueous solvent. Examples thereof include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m each represent an integer of 1 or more), $LiC(C_sF_{2s+1}SO_2)(C_tF_{2t+1}SO_2)(C_uF_{2u+1}$ $SO_2$) (s, t, and u each represent an integer of 1 or more), $Li[B(C_2O_4)_2]$ (lithium bis(oxalate)borate (LiBOB)), $Li[B(C_2O_4)F_2]$, $Li[P(C_2O_4)F_4]$, and $Li[P(C_2O_4)_2F_2]$. These lithium salts may be used alone or in combination.

These electrolytes are preferably used by being dissolved in a nonaqueous solvent to a concentration of 0.1 to 1.5 mol/L and more preferably 0.5 to 1.5 mol/L.

EXAMPLES

The present invention will now be described in further detail using examples. The present invention is not limited to the examples described below and can be implemented with modifications without departing from the spirit of the present invention.

Experiment 1

Example 1

Preparation of Positive Electrode

A lithium-excess transition metal oxide containing 0.25 mol % Nb was used as the positive electrode active material. LiOH was mixed with $Mn_{0.67}Ni_{0.17}Co_{0.17}(OH)_2$ prepared by coprecipitation and niobium oxide ($Nb_2O_5$) at a particular stoichiometric ratio. The resulting mixture was pelletized and fired at 900° C. in air for 24 hours to obtain $Li_{1.2}Mn_{0.54}Ni_{0.13}Co_{0.13}Nb_{0.0025}O_2$. As described above, this lithium-excess transition metal oxide can also be expressed as $0.6Li[Li_{1/3}Mn_{2/3-q}Nb_q]O_2 \cdot 0.4Li(Ni_{1/3}Co_{1/3}Mn_{1/3})_{1-r}Nb_rO_2$ (0.6q+0.4r=0.0025).

This lithium-excess transition metal oxide (90 wt %), 5 wt % acetylene black, and 5 wt % polyvinylidene fluoride (PVdF) were mixed with each other. To the resulting mixture, an adequate amount of N-methyl pyrrolidone (NMP) was added to adjust the viscosity. The resulting mixture was applied to a particular thickness on an aluminum (Al) foil by using a coater or the like. The foil was cut into a 2 cm×2.5 cm piece and rolled with a roller to sufficiently increase the electrical conductivity. Aluminum tabs were attached to the rolled foil and the resulting product was vacuum dried at 110° C. and used as a positive electrode.

Preparation of Negative Electrode

A piece of lithium metal cut to a particular size was used as the negative electrode. A reference electrode of a particular size was also prepared by cutting a piece of lithium metal.

Preparation of Electrolytic Solution

A chain carbonate, diethyl carbonate (DEC), and a cyclic carbonate, ethylene carbonate (EC) were mixed so that the ratio DEC:EC was 70:30 (based on vol %). To this electrolyte solvent, lithium hexafluorophosphate ($LiPF_6$) was added so that the concentration was 1.0 mol/L.

Preparation of Cell

Figure 1:
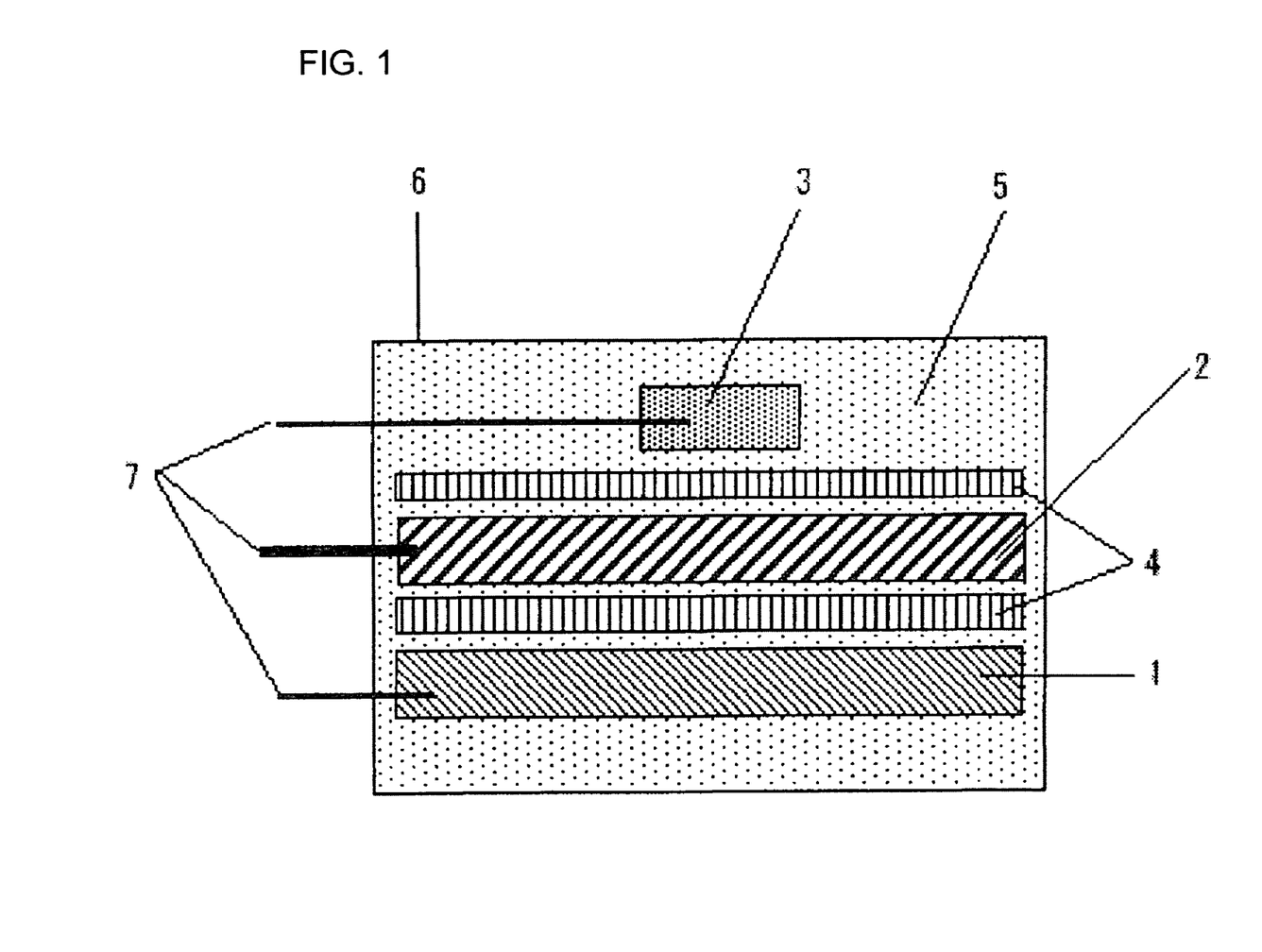
FIG. 1 is a schematic cross-sectional view of a test cell prepared in EXAMPLES according to the present invention.

Referring to FIG. 1, a test cell of Example 1 was prepared by pouring a nonaqueous electrolyte 5 prepared as above into a laminate container 6 in an inert atmosphere. The laminate container contained a positive electrode 2, which was prepared as above and served as the working electrode, a negative electrode 1 which served as a counter electrode and was composed of lithium metal, a reference electrode 3 composed of lithium metal, separators 4, and leads 7.

Charge-Discharge Test

The test cell was charged at a constant current at a current density of 46.8 mA/g until the working electrode potential was 4.8 V on a reference electrode (Li metal) basis. Then the test cell was charged at a constant voltage of 4.8 V until the current density was 11.7 mA/g. The test cell was then discharged at a constant current at a current density of 11.7 mA/g until the working electrode potential was 2.0 V on a Li metal reference electrode basis. This charge-discharge test was performed twice (first cycle and second cycle).

Subsequently, the charge-discharge test was repeated nine times (3rd to 11th cycles) under the same charging conditions but with a current density of 46.8 mA/g during discharge.

Subsequently, the charge-discharge test was conducted once (12th cycle) under the same charging conditions but with a current density of 11.7 mA/g during discharge.

Similarly, the 13th to 21st cycles were conducted at a discharge current of 46.8 mA/g, the 22nd cycle was conducted at a discharge current of 11.7 mA/g, and the 23rd to 30th cycles were conducted at a discharge current of 46.8 mA/g. Other conditions of the charge-discharge test were the same as above.

Example 2

A test cell was prepared and a charge-discharge test was conducted as in EXAMPLE 1 except that a lithium-excess transition metal oxide, $Li_{1.2}Mn_{0.53}Ni_{0.13}Co_{0.13}Nb_{0.01}O_2$ ($0.6Li[Li_{1/3}Mn_{2/3-q}Nb_q]O_2 \cdot 0.4Li(Ni_{1/3}Co_{1/3}Mn_{1/3})_{1-r}Nb_rO_2$ (0.6q+0.4r=0.01)) having a niobium content of 1 mol % was used as the positive electrode active material.

Example 3

A test cell was prepared and charge-discharge test was conducted as in EXAMPLE 1 except that a lithium-excess transition metal oxide, $Li_{1.2}Mn_{0.52}Ni_{0.13}Co_{0.13}Nb_{0.02}O_2$ ($0.6Li[Li_{1/3}Mn_{2/3-q}Nb_q]O_2 \cdot 0.4Li(Ni_{1/3}Co_{1/3}Mn_{1/3})_{1-r}Nb_rO_2$ (0.6q+0.4r=0.02)) having a niobium content of 2 mol % was used as the positive electrode active material.

Comparative Example 1

A lithium-excess transition metal oxide, $Li_{1.2}Mn_{0.54}Ni_{0.13}Co_{0.13}O_2$, containing no niobium was used as the positive electrode active material. LiOH and $Mn^{0.67}Ni_{0.17}Co_{0.17}(OH)_2$ prepared by coprecipitation were mixed at a particular stoichiometric ratio, and the resulting mixture was pelletized and fired at 900° C. in air for 24 hours to obtain $Li_{1.2}Mn_{0.54}Ni_{0.13}Co_{0.13}O_2$.

A test cell was prepared and a charge-discharge test was conducted as in EXAMPLE 1 except that this lithium-excess transition metal oxide containing no niobium was used as the positive electrode active material.

Comparative Example 2

A lithium-excess transition metal oxide containing 0.5 mol % molybdenum (Mo) was used as the positive electrode active material.

LiOH, $Mn_{0.67}Ni_{0.17}Co_{0.17}(OH)_2$ prepared by coprecipitation, and molybdenum oxide ($MoO_2$) were mixed at a particular stoichiometric ratio, and the resulting mixture was pelletized and fired at 900° C. in air for 24 hours to obtain $Li_{1.2}Mn^{0.54}Ni_{0.13}Co_{0.13}Mo^{0.005}O_2$.

A test cell was prepared and a charge-discharge test was conducted as in EXAMPLE 1 except that this lithium-excess transition metal oxide containing Mo was used as the positive electrode active material.

Comparative Example 3

A lithium-excess transition metal oxide containing 0.5 mol % titanium (Ti) was used as the positive electrode active material. LiOH, $Mn_{0.67}Ni_{0.17}Co_{0.17}(OH)_2$ prepared by coprecipitation, and titanium oxide ($TiO_2$) were mixed at a particular stoichiometric ratio, and the resulting mixture was pelletized and fired at 900° C. in air for 24 hours to obtain $Li_{1.2}Mn_{0.54}Ni_{0.13}Co_{0.13}Ti_{0.005}O_2$.

A test cell was prepared and a charge-discharge test was conducted as in EXAMPLE 1 except that this lithium-excess transition metal oxide containing Ti was used as the positive electrode active material.

XRD Profiles

Figure 2:
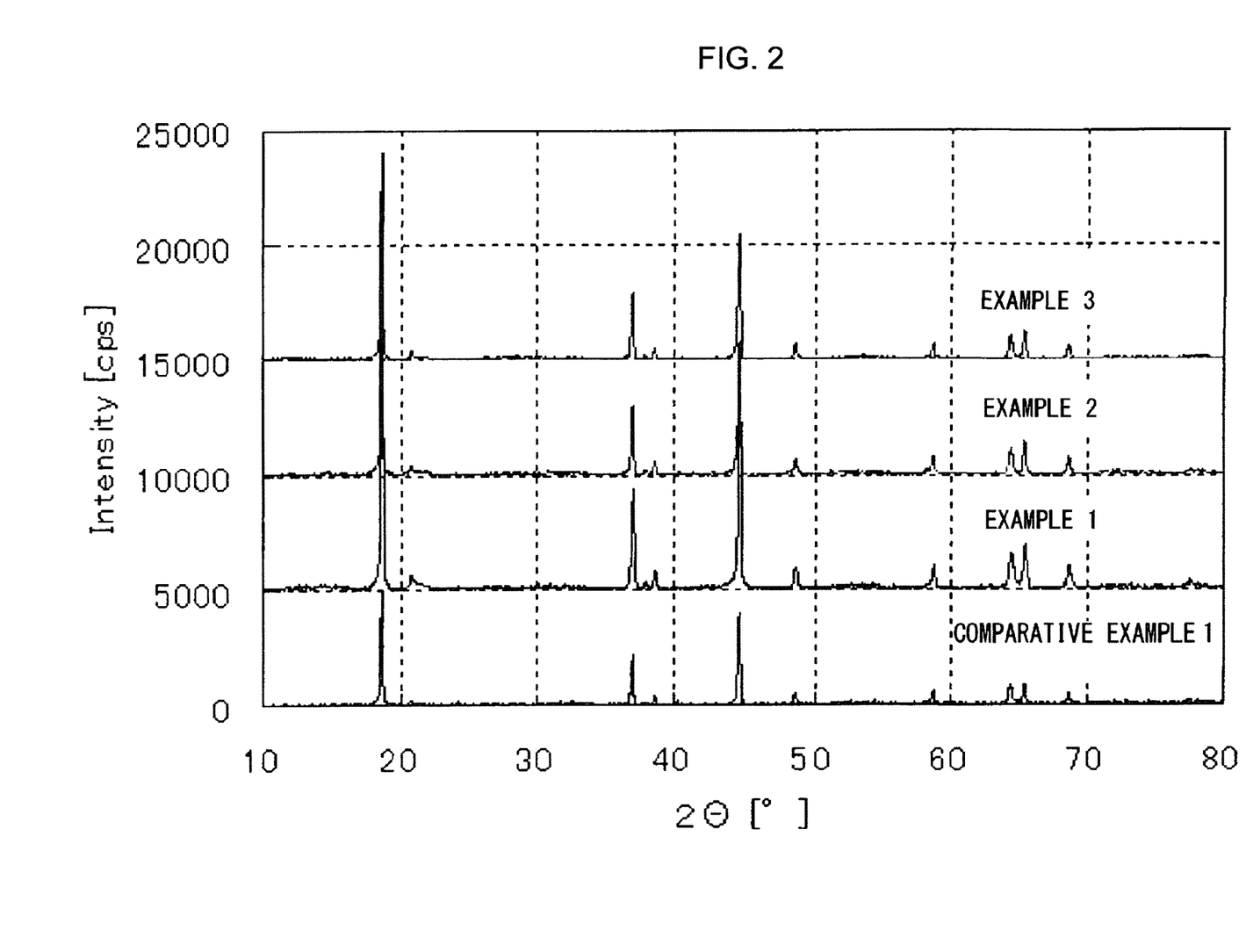
FIG. 2 is a graph showing XRD profiles of positive electrode active materials obtained in EXAMPLES 1 to 3 and COMPARATIVE EXAMPLE 1.

FIG. 2 is a graph of X-ray diffraction (XRD) profiles of the positive electrode active materials obtained in EXAMPLES 1 to 3 and COMPARATIVE EXAMPLE 1. In FIG. 2, the profiles of EXAMPLE 3, EXAMPLE 2, EXAMPLE 1, and COMPARATIVE EXAMPLE 1 are shown in that order from the top of the graph.

The XRD profiles of FIG. 2 show that the positive electrode active materials synthesized in EXAMPLES 1 to 3 and COMPARATIVE EXAMPLE 1 have structures that belong to space group R-3m and structures that belong to space group C2/c or C2/m.

Figure 3:
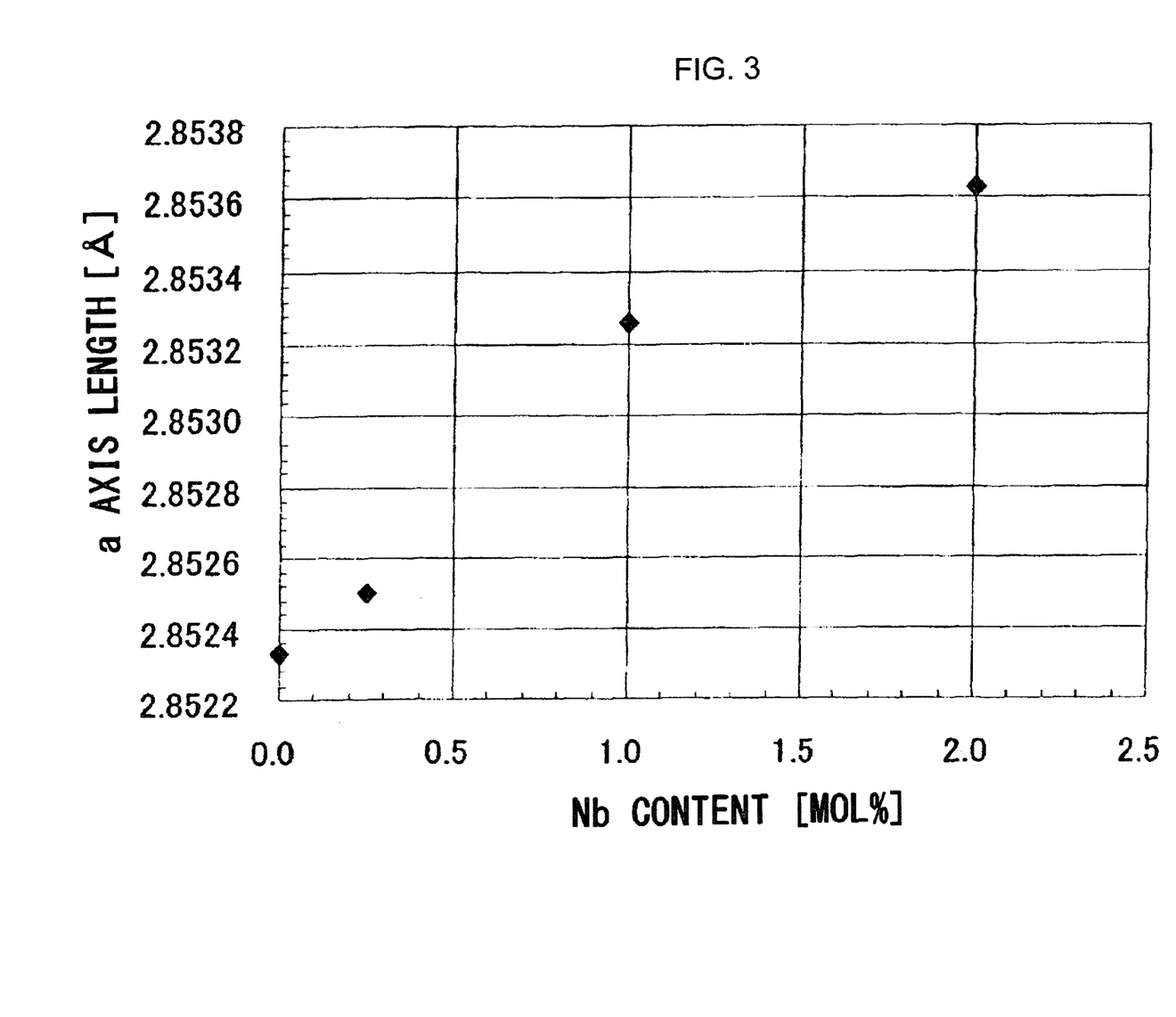
FIG. 3 is a graph showing the relationship between the a axis length of a unit cell and a niobium content.

FIG. 3 is a graph showing the a axis length of a unit cell versus the Nb content. The a axis length of the unit cell was calculated by fitting the XRD profiles shown in FIG. 2 to space group R-3m.

As shown in FIG. 3, the a axis length of the unit cell increases with the Nb content. This presumably shows a constitutional element, Li, Mn, Ni, Co, or O of the lithium-excess transition metal oxide is being replaced with Nb.

Charge-Discharge Characteristics

Figure 4:
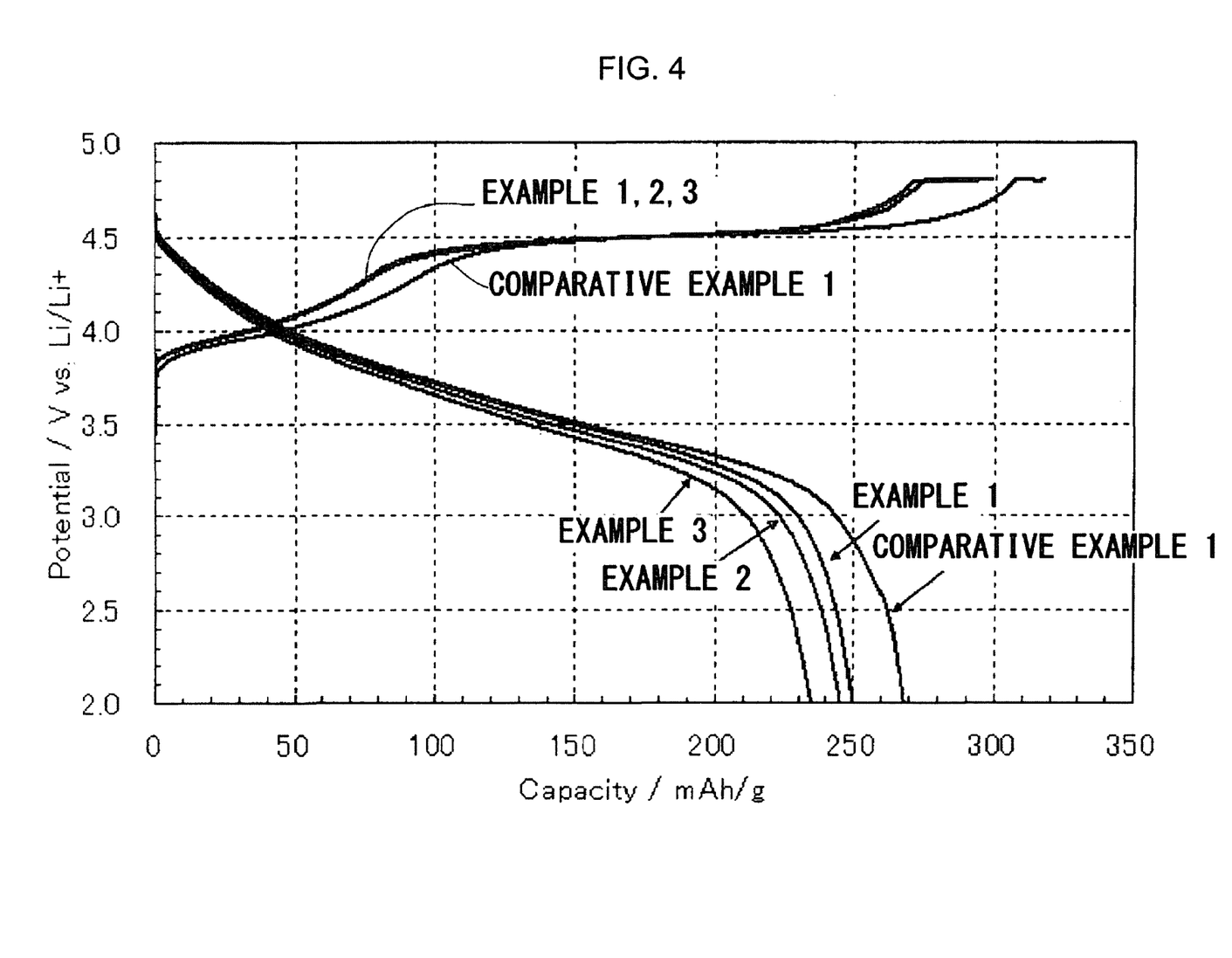
FIG. 4 is a graph showing initial charge and discharge curves in EXAMPLES 1 to 3 and COMPARATIVE EXAMPLE 1.

FIG. 4 is a graph showing initial (first cycle) charge and discharge curves of EXAMPLES 1 to 3 and COMPARATIVE EXAMPLE 1. The curves on the upper side of the graph are charge curves. The charge curves of EXAMPLES 1 to 3 are substantially superimposed on one another. The curves on the lower side of the graph are discharge curves. These discharge curves clearly show that the discharge capacity densities of the initial cycle in EXAMPLES 1 to 3 are lower than the discharge capacity density of the initial cycle in COMPARATIVE EXAMPLE 1.

The charge curves of EXAMPLES 1 to 3 and COMPARATIVE EXAMPLE 1 have flat regions at 4.5 V on a Li basis. Presumably, oxygen desorption associated with initial charging occurs in these flat regions.

Figure 5:
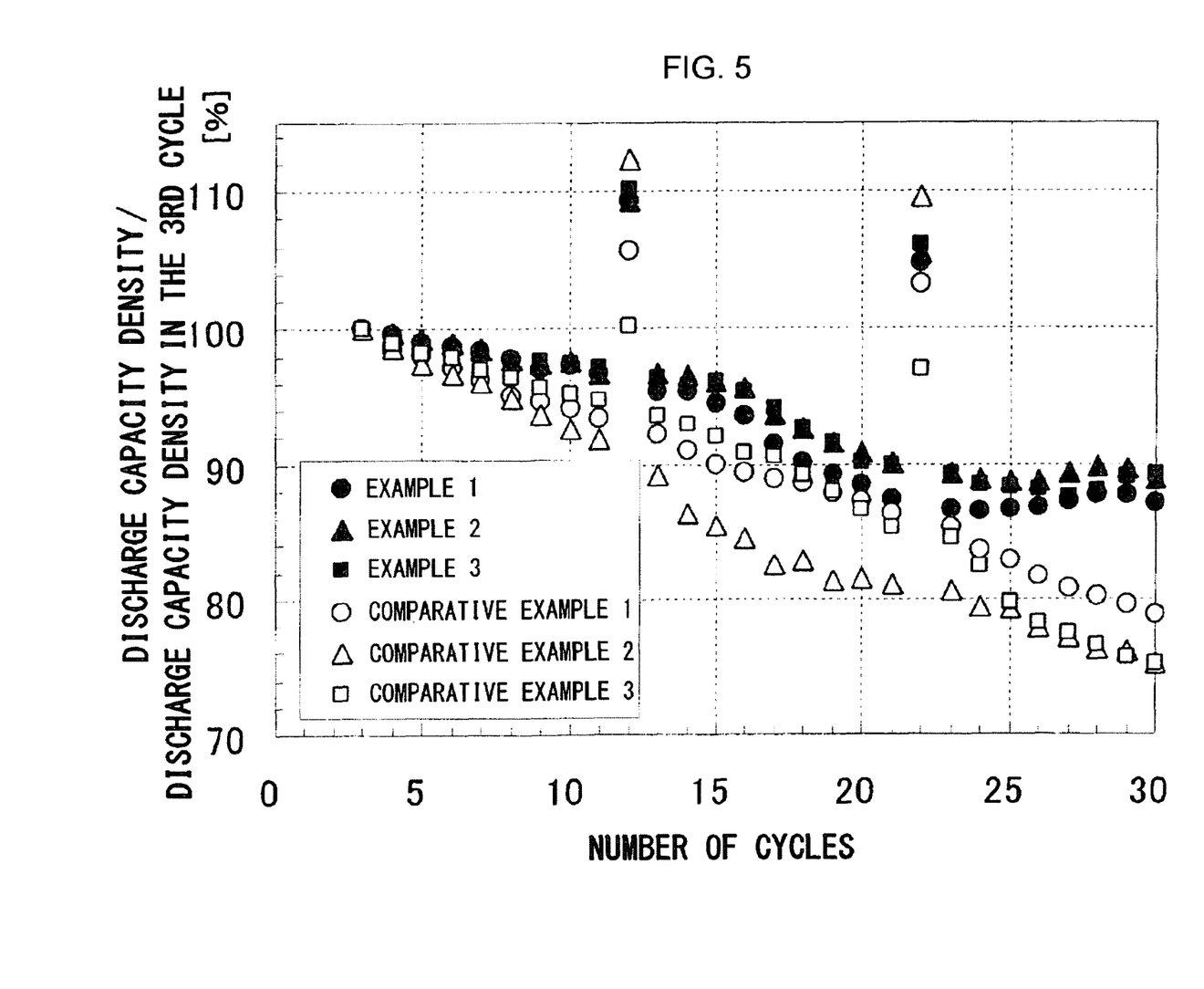
FIG. 5 is a graph showing discharge capacity densities of the 3rd to 30th cycle in EXAMPLES 1 to 3 and COMPARATIVE EXAMPLES 1 to 3.

FIG. 5 is a graph showing discharge capacity densities from the 3rd to 30th cycles in EXAMPLES 1 to 3 and COMPARATIVE EXAMPLES 1 to 3 each plotted under the assumption that the discharge capacity density of the third cycle is 100%.

As shown in FIG. 5, the discharge capacity densities are high in the 12th cycle and the 22nd cycle. This is because test was conducted at a low current density (11.7 mA/g, equivalent to 0.05 It) to check the capacity density. Testing was conducted at a current density of 46.8 mA/g (equivalent to 0.2 It) in other cycles.

As shown in FIG. 5, in EXAMPLES 1 to 3, the discharge densities are higher than those of COMPARATIVE EXAMPLE 1 for all cycles. This shows that when niobium is contained in the lithium-excess transition metal oxide, the degradation of discharge capacity density during cycle testing can be suppressed and the cycle characteristics can be improved.

In COMPARATIVE EXAMPLE 2, molybdenum is contained and in COMPARATIVE EXAMPLE 3, titanium is contained. However, the discharge capacity densities of COMPARATIVE EXAMPLE 2 containing molybdenum and COMPARATIVE EXAMPLE 3 containing titanium are lower than that of COMPARATIVE EXAMPLE 1 containing no additive elements, showing no improvements of cycle characteristics. Accordingly, it is clear that the effect of improving the cycle characteristics accomplished by inclusion of niobium is a unique effect since no such effect is exhibited in examples using molybdenum and titanium.

Table 1 shows the initial discharge capacity densities, discharge capacity retention ratios, and the discharge capacity densities in the 30th cycle of EXAMPLES 1 to 3 and COMPARATIVE EXAMPLES 1 to 3.

The discharge capacity retention ratios shown in Table 1 were calculated using the following equation:

Discharge capacity retention ratio (%)=30th cycle discharge capacity density/3rd cycle discharge capacity density×100

TABLE 1

| | Additive element | Additive element content (mol %) | Initial discharge capacity density (mAh/g) | Discharge capacity retention ratio (%) | 30th cycle discharge capacity density (mAh/g) |
|---|---|---|---|---|---|
| EXAMPLE 1 | Nb | 0.25 | 250 | 87.1 | 186 |
| EXAMPLE 2 | Nb | 1 | 245 | 88.9 | 187 |
| EXAMPLE 3 | Nb | 2 | 230 | 89.2 | 180 |
| COMPARATIVE EXAMPLE 1 | — | 0 | 268 | 78.7 | 178 |
| COMPARATIVE EXAMPLE 2 | Mo | 0.5 | 270 | 75.2 | 162 |
| COMPARATIVE EXAMPLE 3 | Ti | 0.5 | 268 | 75.2 | 163 |

Table 1 shows that although the initial discharge capacity densities of EXAMPLES 1 to 3 are lower than those of COMPARATIVE EXAMPLES 1 to 3, the discharge capacity retention ratios of EXAMPLES 1 to 3 are higher than those of COMPARATIVE EXAMPLES 1 to 3. Thus, the discharge capacity densities at the 30th cycle are higher in EXAMPLES 1 to 3 than in COMPARATIVE EXAMPLES 1 to 3.

Figure 6:
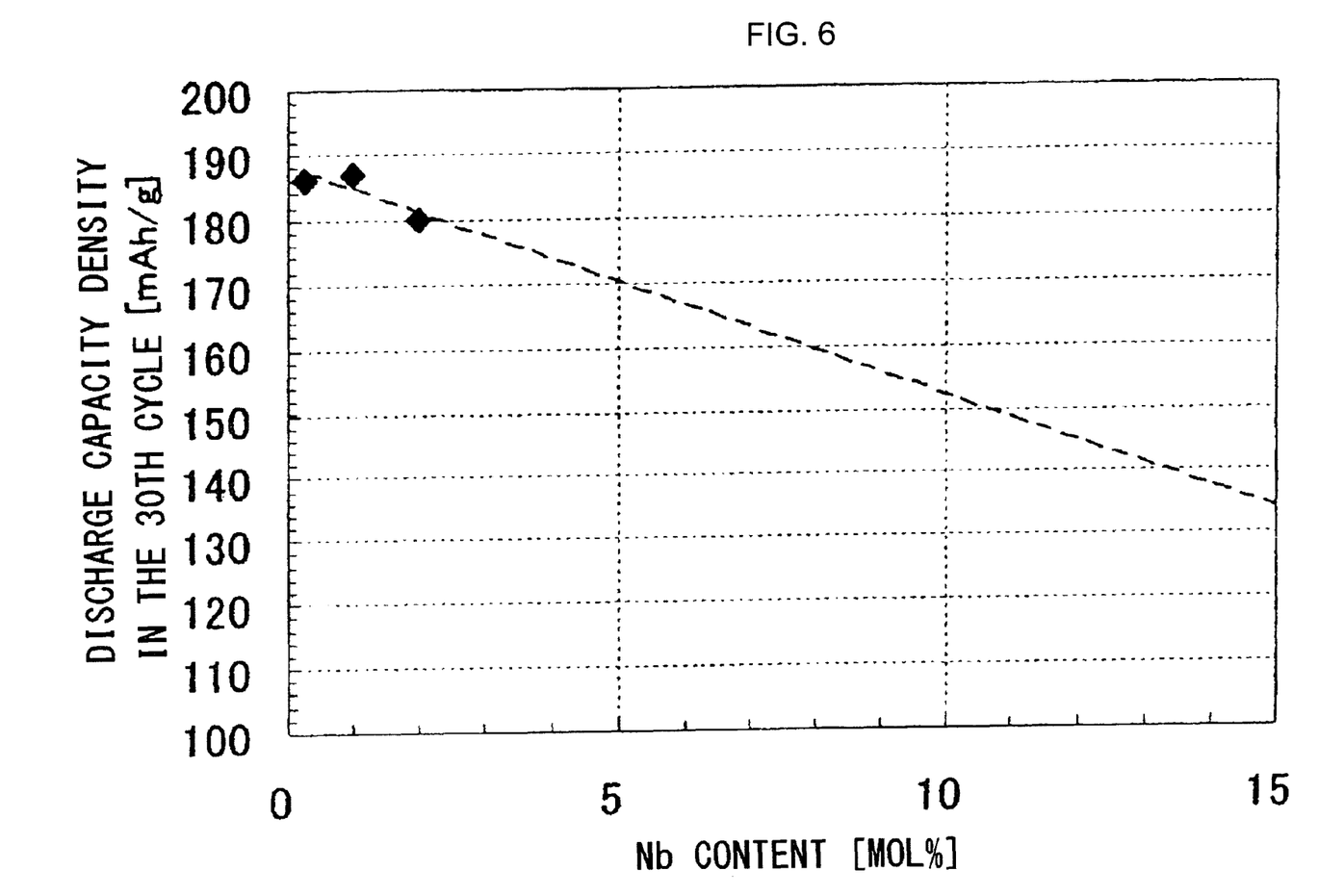
FIG. 6 is a graph showing the relationship between the Nb content and the discharge capacity density in the 30th cycle.

FIG. 6 is a graph showing the relationship between the Nb content relative to the lithium-excess transition metal oxide and the discharge capacity density in the 30th cycle.

A broken line shown in FIG. 6 was drawn by linearly approximating the discharge capacity densities of EXAMPLES 1 to 3 in the thirtieth cycle by a least-square method and extending the resulting line to a point where the Nb content is 15 mol %. The discharge capacity density of $LiCoO_2$ commonly used as the positive electrode active material of lithium ion secondary batteries is about 150 mAh/g. Thus, the Nb content is preferably 0.05 mol % or more and 10 mol % or less in order to achieve a discharge capacity density higher than 150 mAh/g, which is the discharge capacity density of $LiCoO_2$, in the thirtieth cycle. In order to maintain a high discharge capacity density of 180 mAh/g or more, the Nb content is preferably 0.1 mol % or more and 2 mol % or less. In order to maintain a high discharge capacity density of 185 mAh/g or more, the Nb content is preferably 0.25 mol % or more and 1 mol % or less.

Experiment 2

Example 4

A test cell was prepared as in EXAMPLE 1 except that a lithium-excess transition metal oxide containing 1 mol % Nb, i.e., $Li_{1.2}Mn_{0.59}Ni_{0.2}Nb_{0.01}O_2$ ($0.6Li[Li_{1/3}Mn_{2/3-q}Nb_q]O_2 \cdot 0.4Li(Ni_{0.5}Mn_{0.5})_{1-r}Nb_rO_2(0.6q+0.4r=0.01)$), was used as the positive electrode active material.

It was confirmed by XRD measurement that this positive electrode active material has a structure that belongs to space group R-3m and a structure that belongs to space group C2/c or C2/m.

Example 5

A test cell was prepared as in EXAMPLE 1 except that, as in EXAMPLE 2, a lithium-excess transition metal oxide containing 1 mol% Nb, i.e., $Li_{1.2}Mn_{0.53}Ni_{0.13}Co_{0.13}Nb_{0.01}O_2$ ($0.6Li[Li_{1/3}Mn_{2/3-q}Nb_q]O_2 \cdot 0.4Li(Ni_{1/3}Co_{1/3}Mn_{1/3})_{1-r}Nb_rO_2$ ($0.6q+0.4r=0.01$)), was used as the positive electrode active material.

It was confirmed by XRD measurement that this positive electrode active material has a structure that belongs to space group R-3m and a structure that belongs to space group C2/c or C2/m.

Comparative Example 4

A test cell was prepared as in EXAMPLE 1 except that a lithium-excess transition metal oxide containing no Nb, i.e., $Li_{1.2}Mn_{0.60}Ni_{0.2}O_2$ ($0.6Li[Li_{1/3}Mn_{2/3}]O_2 \cdot 0.4Li(Ni_{0.5}Mn_{0.5})O_2$), was used as the positive electrode active material.

It was confirmed by XRD measurement that this positive electrode active material has a structure that belongs to space group R-3m and a structure that belongs to space group C2/c or C2/m.

Comparative Example 5

A test cell was prepared as in EXAMPLE 1 except that a lithium-excess transition metal oxide containing no Nb, i.e., $Li_{1.2}Mn_{0.53}Ni_{0.13}Co_{0.13}O_2$ ($0.6Li[Li_{1/3}Mn_{2/3}]O_2 \cdot 0.4Li(Ni_{1/3}Co_{1/3}Mn_{1/3})O_2$), was used as the positive electrode active material.

It was confirmed by XRD measurement that this positive electrode active material has a structure that belongs to space group R-3m and a structure that belongs to space group C2/c or C2/m.

Charge-Discharge Cycle Test

Test cells of EXAMPLES 4 and 5 and COMPARATIVE EXAMPLES 4 and 5 were each charged at a constant current until the working electrode potential on a reference electrode (Li metal) basis was 4.8 V at a current density of 100 mA/g, charged at a constant voltage of 4.8 V until the current density was 12.5 mA/g, and then discharged at a constant current until the working electrode potential on a Li metal reference electrode basis was 2.0 V at a current density of 100 mA/g. A discharge capacity Q1 was then calculated. The charge-discharge operation was subsequently continuously repeated 14 times under the same conditions. The discharge capacity Q2 of the 15th cycle was calculated and the capacity retention ratio of the cycles was determined as the ratio of the capacity Q2 to the capacity Q1 (Q2/Q1)×100. The measurement results are shown in Table 2 below. The capacity retention ratio in Table 2 is a relative value when the value of COMPARATIVE EXAMPLE 4 is assumed to be 100 for EXAMPLE 4 and a relative value when the value of COMPARATIVE EXAMPLE 5 is assumed to be 100 for EXAMPLE 5.

TABLE 2

| | Composition | Additive element | Capacity retention ratio |
|---|---|---|---|
| EXAMPLE 4 | $Li_{1.2}Mn_{0.59}Ni_{0.2}Nb_{0.01}O_2$ | Nb | 101 |
| COMPARATIVE EXAMPLE 4 | $Li_{1.2}Mn_{0.60}Ni_{0.2}O_2$ | — | 100 |
| EXAMPLE 5 | $Li_{1.2}Mn_{0.53}Ni_{0.13}Co_{0.13}Nb_{0.01}O_2$ | Nb | 108 |
| COMPARATIVE EXAMPLE 5 | $Li_{1.2}Mn_{0.53}Ni_{0.13}Co_{0.13}O_2$ | — | 100 |

Table 2 shows that the test cells of EXAMPLES 4 and 5 that use a Nb-containing lithium-excess transition metal oxide have better cycle characteristics at a high voltage compared to test cells of COMPARATIVE EXAMPLES 4 and 5. The effect of improving the cycle characteristics brought about by inclusion of niobium is particularly great for the Co-containing lithium-excess transition metal oxide of EXAMPLE 5 compared to the lithium-excess transition metal oxide containing no Co of EXAMPLE 4. Although the reason for this is not clear, it is presumably attributable to substitution of some of constitutional element atoms with niobium atoms caused by inclusion of niobium, which presumably stabilized the electronic state around the cobalt atoms in Co-containing lithium-excess transition metal oxide.

Experiment 3

The effects of Ni, Co, and Mn contents in the lithium-excess transition metal oxide on the capacity were studied.

Example 6

A test cell was prepared as in EXAMPLE 1 except that, as in EXAMPLE 4, a lithium-excess transition metal oxide containing 1 mol % Nb, i.e., $Li_{1.2}Mn_{0.59}Ni_{0.2}Nb_{0.01}O_2$ ($0.6Li[Li_{1/3}Mn_{2/3-q}Nb_d]O_2 \cdot 0.4Li(Ni_{0.5}Mn_{0.5})_{1-r}Nb_rO_2$ ($0.6q+0.4r=0.01$)), was used as the positive electrode active material.

It was confirmed by XRD measurement that this positive electrode active material has a structure that belongs to space group R-3m and a structure that belongs to space group C2/c or C2/m.

Example 7

A test cell was prepared as in EXAMPLE 1 except that a lithium-excess transition metal oxide containing 1 mol % Nb, i.e., $Li_{1.2}Mn_{0.55}Ni_{0.16}Co_{0.08}Nb_{0.01}O_2$ ($0.6Li[Li_{1/3}Mn_{2.3-q}Nb_d]O_2 \cdot 0.4Li(Ni_{0.4}Co_{0.2}Mn_{0.4})_{1-r}Nb_rO_2$ ($0.6q+0.4r=0.01$)), was used as the positive electrode active material.

It was confirmed by XRD measurement that this positive electrode active material has a structure that belongs to space group R-3m and a structure that belongs to space group C2/c or C2/m.

Example 8

A test cell was prepared as in EXAMPLE 1 except that, as in EXAMPLES 2 and 5, a lithium-excess transition metal oxide containing 1 mol % Nb, i.e., $Li_{1.2}Mn_{0.53}Ni_{0.13}Co_{0.13}Nb_{0.01}O_2$ ($0.6Li[Li_{1/3}Mn_{2/3-q}Nb_d]O_2 \cdot 0.4Li(Ni_{1/3}Co_{1/3}Mn_{1/3})_{1-r}Nb_rO_2$ ($0.6q+0.4r=0.01$)), was used as the positive electrode active material.

It was confirmed by XRD measurement that this positive electrode active material has a structure that belongs to space group R-3m and a structure that belongs to space group C2/c or C2/m.

Example 9

A test cell was prepared as in EXAMPLE 1 except that a lithium-excess transition metal oxide containing 1 mol % Nb, i.e., $Li_{1.2}Mn_{0.47}Ni_{0.08}Co_{0.24}Nb_{0.01}O_2(0.6Li[Li_{1/3}Mn_{2/3-q}Nb_d]O_2 \cdot 0.4Li(Ni_{0.2}Co_{0.6}Mn_{0.2})_{1-r}Nb_rO_2(0.6q+0.4r=0.01))$, was used as the positive electrode active material.

It was confirmed by XRD measurement that this positive electrode active material has a structure that belongs to space group R-3m and a structure that belongs to space group C2/c or C2/m.

Example 10

A test cell was prepared as in EXAMPLE 1 except that a lithium-excess transition metal oxide containing 1 mol % Nb, $Li_{1.2}Mn_{0.39}Co_{0.4}Nb_{0.01}O_2(0.6Li[Li_{1/3}Mn_{2/3-q}Nb_q]O_2 \cdot 0.4LiCo_{1-r}Nb_rO_2(0.6q+0.4r=0.01))$, was used as the positive electrode active material.

It was confirmed by XRD measurement that this positive electrode active material has a structure that belongs to space group R-3m and a structure that belongs to space group C2/c or C2/m.

Charge-Discharge Characteristics
Charge-Discharge Test

Test cells of EXAMPLES 6 to 10 were each charged at a constant current until the working electrode potential on a reference electrode (Li metal) basis was 4.6 V at a current density of 50 mA/g and then charged at a constant voltage of 4.6 V until the current density was 12.5 mA/g. Subsequently, the cells were discharged at a constant current until the working electrode potential on the Li metal reference electrode basis was 2.0 V at a current density of 25 mA/g. Then the discharge capacity was calculated. The results are shown in Table 3 below.

TABLE 3

| | Composition | Discharge capacity (mAh/g) | Initial charge/discharge efficiency |
|---|---|---|---|
| EXAMPLE 6 | $Li_{1.2}Mn_{0.59}Ni_{0.2}Nb_{0.01}O_2$ | 219 | 79.9 |
| EXAMPLE 7 | $Li_{1.2}Mn_{0.55}Ni_{0.16}Co_{0.08}Nb_{0.01}O_2$ | 230 | 83.2 |
| EXAMPLE 8 | $Li_{1.2}Mn_{0.53}Ni_{0.13}Co_{0.13}Nb_{0.01}O_2$ | 240 | 82.2 |
| EXAMPLE 9 | $Li_{1.2}Mn_{0.47}Ni_{0.08}Co_{0.24}Nb_{0.01}O_2$ | 244 | 82.5 |
| EXAMPLE 10 | $Li_{1.2}Mn_{0.39}Co_{0.4}Nb_{0.01}O_2$ | 222 | 73.2 |

Table 3 shows that test cells of EXAMPLES 7 to 9 in which the manganese (Mn), nickel (Ni), and cobalt (Co) contents in the lithium transition metal oxide, $Li(Li_aMn_bNi_cCO_dNb_q)O_2$ satisfy $0.4 \leq b<0.67$, $0.05 \leq c<0.2$, and $0.05 \leq d<0.3$ display higher discharge capacities and initial charge-discharge efficiencies compared to test cells of EXAMPLES 6 and 10.

It can be understood from the table that positive electrodes of EXAMPLES 7 to 9 can achieve high discharge capacities and initial charge-discharge efficiencies when y and z in $xLi[Li_{1/3}Mn_{2/3-q}Nb_q]O_2 \cdot (1-x)Li(Ni_yCo_{1-y-z}Mn_z)_{1-r}Nb_rO_2$ are respectively in the ranges of $0.2 \leq y \leq 0.4$ and $0.2 \leq z \leq 0.4$.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A lithium ion secondary battery comprising:
a positive electrode containing a positive electrode active material;
a negative electrode containing a negative electrode active material; and
a nonaqueous electrolyte,
wherein the positive electrode active material is a lithium transition metal oxide that contains niobium and is represented by $xLi[Li_{1/3}Mn_{2/3-q}Nb_q]O_2 \cdot (1-x)LiM_{1-r}Nb_rO_2$ ($0<x<1$, $0<xq+(1-x)r \leq 0.3$, $0 \leq q \leq 0.3$, $0 \leq r \leq 0.3$, and M: at least one element selected from the group consisting of nickel, cobalt, and manganese).

2. The lithium ion secondary battery according to claim 1, wherein M in the formula representing the lithium transition metal oxide represents three elements, nickel, cobalt, and manganese.

3. The lithium ion secondary battery according to claim 2, wherein the positive electrode active material is a lithium transition metal oxide that contains niobium and is represented by $xLi[Li_{1/3}Mn_{2/3-q}Nb_q]O_2 \cdot (1-x)Li(Ni_yCo_{1-y-z}Mn_z)_{1-r}Nb_rO_2$ ($0<x<1$, $0<xq+(1-x)r \leq 0.3$, $0 \leq q \leq 0.3$, $0 \leq r \leq 0.3$, $0.2 \leq y \leq 0.4$, and $0.2 \leq z \leq 0.4$).

4. The lithium ion secondary battery according to claim 1, wherein oxygen desorbs from the positive electrode active material during initial charging.

5. The lithium ion secondary battery according to claim 2, wherein oxygen desorbs from the positive electrode active material during initial charging.

6. The lithium ion secondary battery according to claim 3, wherein oxygen desorbs from the positive electrode active material during initial charging.

7. The lithium ion secondary battery according to claim 1, wherein $xq+(1-x)r$ in the formula representing the lithium transition metal oxide satisfies $0.0025 \leq xq+(1-x)r \leq 0.02$.

8. The lithium ion secondary battery according to claim 2, wherein $xq+(1-x)r$ in the formula representing the lithium transition metal oxide satisfies $0.0025 \leq xq+(1-x)r \leq 0.02$.

9. The lithium ion secondary battery according to claim 3, wherein $xq+(1-x)r$ in the formula representing the lithium transition metal oxide satisfies $0.0025 \leq xq+(1-x)r \leq 0.02$.

10. The lithium ion secondary battery according to claim 4, wherein $xq+(1-x)r$ in the formula representing the lithium transition metal oxide satisfies $0.0025 \leq xq+(1-x)r \leq 0.02$.

11. The lithium ion secondary battery according to claim 1, wherein the lithium transition metal oxide includes a structure that belongs to space group C2/c or C2/m.

12. The lithium ion secondary battery according to claim 2, wherein the lithium transition metal oxide includes a structure that belongs to space group C2/c or C2/m.

13. The lithium ion secondary battery according to claim 3, wherein the lithium transition metal oxide includes a structure that belongs to space group C2/c or C2/m.

14. The lithium ion secondary battery according to claim 4, wherein the lithium transition metal oxide includes a structure that belongs to space group C2/c or C2/m.

* * * * *